M. D. BUSKIRK.
SPRAYER.
APPLICATION FILED JUNE 1, 1909.
996,611.
Patented July 4, 1911.
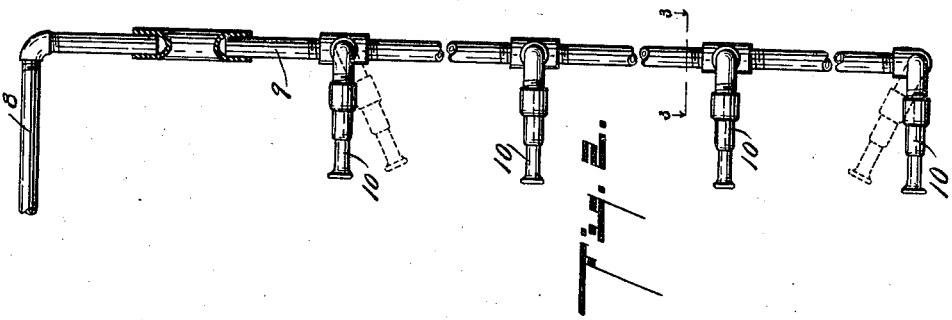
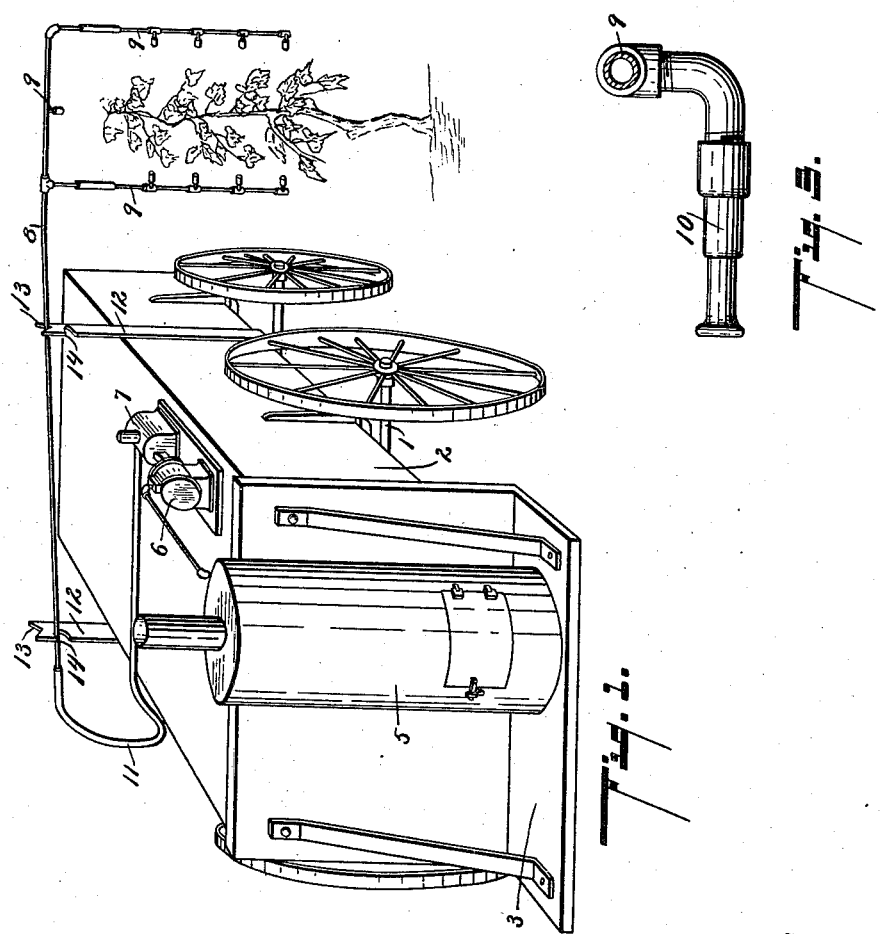
Witnesses
F. Gertrude Tallman
Elora E. Braden
Inventor
Mulford D. Buskirk
By Chappell & Earl
Attorneys

UNITED STATES PATENT OFFICE.

MULFORD D. BUSKIRK, OF PAW PAW, MICHIGAN.

SPRAYER.

996,611.   Specification of Letters Patent.   Patented July 4, 1911.

Application filed June 1, 1909. Serial No. 499,385.

*To all whom it may concern:*

Be it known that I, MULFORD D. BUSKIRK, a citizen of the United States, residing at Paw Paw, Van Buren county, Michigan, have invented certain new and useful Improvements in Sprayers, of which the following is a specification.

This invention relates to improvements in spraying apparatus.

My improved spraying apparatus is particularly designed and especially adapted by me for spraying grape vines, although it is desirable and may be readily adapted for use in various other relations.

The main objects of this invention are: First, to provide an improved spraying device, which is highly efficient, and, in spraying such vines as grape vines, effectively sprays the entire vine. Second, to provide an improved spraying apparatus which is very efficient and at the same time uses a minimum of the spraying solution. Third, to provide an improved spraying apparatus, which is easy to manipulate. Fourth, to provide an improved spraying apparatus, which can be easily operated, so that the operator is protected from the spray. Fifth, to provide an improved spraying apparatus which is very simple and economical in structure.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a rear perspective view of a structure embodying the features of my invention. Fig. 2 is an enlarged detail view of one of the arms of my improved spray head. Fig. 3 is an enlarged cross section, taken on a line corresponding to line 3—3 of Fig. 2.

In the drawing, similar reference characters refer to similar parts throughout both views.

Referring to the drawing, 1 represents the running gear, which, in the structure illustrated, is of the ordinary farm wagon type. The tank 2 illustrated is of rectangular form, adapted to fit the wagon bolsters. The top of the tank is adapted to serve as a platform for the operator and driver, suitable seats being preferably provided, which seats, however, are not here illustrated.

On the rear of the tank is a support 3 for the boiler 5, the boiler being shown in conventional form. An engine 6, which is also shown in conventional form, is provided for driving the pump 7.

My improved spray head is yoke-like in form, and preferably consists of the rigid pipe 8, having a pair of downwardly-projecting delivery arms 9 thereon. These arms are provided with a plurality of oppositely-disposed horizontal nozzles 10, the nozzles being adapted to deliver inwardly toward each other, as clearly appears from the drawing, so that the head may be straddled over a vine, as is indicated in the drawing. I also preferably provide the pipe 8 with a nozzle 9, arranged to deliver downwardly between the arms. The pipe 8 is connected to the pump by a flexible connection 11, so that it may be manipulated by the operator to bring the same into proper position over the vine or lift it over posts or the like. The sprayer is preferably supported by a pair of supports 12, which have rests 13 and 14 for the pipe 8, the pipe resting in the rest 13 of one support and being engaged in the rest 14 of the other, as clearly appears from the drawing, so that it may be shifted longitudinally to keep the head in proper position over the vines, as the wagon is driven along at the side of the row. By this form of head, the nozzles delivering toward each other, the spray from one meets that of the other at a central point creating a swirling movement, so that the vines are sprayed on all sides, and the blowing of the spray beyond the vine largely prevented. It is found that, when the spray is delivering from one side, a large portion is carried through and beyond the vines and wasted; also, the force of the spray blows and holds the leaves to one side, so that only one side is effectively treated. By arranging the nozzles on the head between the arms, the spray is prevented from rising, so that it settles to the ground about the vines, which is another very desirable feature.

It is found in practice that the apparatus can be used even when there is considerable wind, which ordinarily prevents spraying, or prevents spraying when the common form of apparatus is used. This is also of very great advantage, as there are certain seasons or times during the year when most satisfactory results are secured from the spray. A further advantage is that the spray head may be shifted from one side of the wagon to the other, as conditions may require.

The spray head is preferably made up of sections of pipe connected by suitable T-couplings in which the nozzles 10 are mounted, the nozzles being threaded into the couplings so that they may be adjusted, if desired, as is indicated in Fig. 2.

My improved spraying apparatus is very simple and economical in structure, and is very efficient in use, not only in that the vines are thoroughly sprayed, but that this is done with a minimum amount of material.

I have illustrated and described my improved spraying apparatus in the form which I have found practical in use, the pump, engine and boiler being illustrated in conventional form. While I have made use of a steam engine, an explosion engine could be utilized for the purpose, and, while I have illustrated the structure in detail in the form in which I have embodied it, I am aware that it is capable of very great modification in structural detail without departing from my invention, but, as these modifications will be apparent to those skilled in the art to which this invention relates, I have not attempted to illustrate or describe the same herein.

Having thus described my invention, what I claim as new and desire to secure by Letters Patent is:

1. In a spraying apparatus, the combination with a running gear, tank and pump, the top of the tank being adapted to serve as a platform, of a delivery pipe having a pair of downwardly-projecting arms thereon; a plurality of delivery nozzles, comprising a nozzle on said pipe arranged to deliver downwardly between said arms and nozzles on said arms disposed oppositely and horizontally to deliver inwardly; a flexible connecting pipe for said delivery pipe to said pump; and a pair of supports for said delivery pipe projecting above said platform, each of said supports being provided with a pair of rests whereby the said pipe may be adjustably supported at either side of said tank, all coacting as specified.

2. In a spraying apparatus, the combination with a running gear, tank and pump, the top of the tank being adapted to serve as a platform; a delivery pipe having a pair of downwardly-projecting arms thereon; delivery nozzles on said arms oppositely and horizontally disposed to deliver inwardly; a flexible connecting pipe for said delivery pipe to said pump; and a pair of supports for said delivery pipes projecting above said platform, each of said supports being provided with a pair of rests whereby the said pipe may be adjustably supported at either side of said tank, all coacting as specified.

3. In a spraying apparatus, the combination with a running gear, tank and pump; a delivery pipe having a pair of downwardly-projecting arms thereon; a plurality of delivery nozzles, comprising a nozzle on said pipe arranged to deliver downwardly between said arms and nozzles on said arms disposed oppositely and horizontally to deliver inwardly; a flexible connecting pipe for said delivery pipe to said pump; and a pair of supports for said delivery pipe each of said supports being provided with a pair of rests whereby the said pipe may be adjustably supported at either side of said tank, all coacting as specified.

4. In a spraying apparatus, the combination with a running gear, tank and pump, the top of the tank being adapted to serve as a platform; a rigid delivery pipe; a yoke-like spraying head thereon, the arm portions of the head being adapted to deliver toward each other, and the top portion being adapted to deliver downwardly between the said arm portions; a flexible connecting pipe for said delivery pipe to said pump; and a pair of supports for said delivery pipe projecting above said platform, each of said supports being provided with rests whereby the said pipe may be adjustably supported at either side of said tank, all coacting as specified.

5. In a spraying apparatus, the combination with a running gear, tank and pump, the top of the tank being adapted to serve as a platform; a rigid delivery pipe; a yoke-like spraying head thereon, the arm portions of the head being adapted to deliver toward each other; a flexible connecting pipe for said delivery pipe to said pump; and a pair of supports for said delivery pipe projecting above said platform, each of said supports being provided with a pair of rests whereby the said pipe may be removably and adjustably supported at either side of said tank and manipulated from said platform, all coacting as specified.

6. In a spraying apparatus, the combination with a running-gear, tank, pump and operator's platform, of a delivery pipe having a pair of downwardly-projecting arms thereon; a plurality of delivery nozzles comprising a nozzle on said pipe arranged to deliver downwardly between said arms and nozzles on said arms disposed oppositely and horizontally to deliver inwardly toward each other; a flexible connecting pipe for said delivery pipe to said pump; and supports arranged at each side of said platform and projecting above the same, said supports being provided with rests coacting to support said pipe so that it may be freely tilted and adjusted longitudinally, or lifted from, or its position reversed in said rests, all coacting for the purpose specified.

7. In a spraying apparatus, the combination with a running-gear, tank, pump and operator's platform, of a delivery pipe having a pair of downwardly-projecting arms thereon, delivery nozzles on said arms oppositely and horizontally disposed to deliver inwardly; a flexible connecting pipe for said delivery pipe to said pump; and a pair of rests arranged one at each side of said platform and adapted to coact in supporting said pipe so that its position may be reversed therein or it may be freely tilted or shifted longitudinally, all coacting for the purpose specified.

8. In a spraying apparatus, the combination with a running-gear, tank, pump and operator's platform, of a delivery pipe having a spray head thereon, a flexible connecting pipe for said delivery pipe to said pump; and a pair of rests arranged one at each side of said platform and adapted to coact in supporting said pipe so that its position may be reversed therein or it may be freely tilted or shifted longitudinally, all coacting for the purpose specified.

9. In a spraying apparatus, the combination with a running-gear, tank, pump and operator's platform, of a delivery pipe having a spray head thereon; a flexible connecting pipe for said delivery pipe to said pump; and rests adapted to coact in supporting said pipe so that its position may be reversed therein or it may be freely tilted and shifted longitudinally, or disengaged therefrom, all coacting for the purpose specified.

In witness whereof, I have hereunto set my hand and seal in the presence of two witnesses.

MULFORD D. BUSKIRK. [L. S.]

Witnesses:
Wm. Killefer,
H. A. Cole.

---

Copies of this patent may be obtained for five cents each, by addressing the "Commissioner of Patents, Washington, D. C."